United States Patent
Yang et al.

(10) Patent No.: US 8,540,910 B2
(45) Date of Patent: Sep. 24, 2013

(54) METHOD FOR PRODUCING A REFRACTORY MATERIAL FROM ALUMINUM RESIDUES

(75) Inventors: Sheng-Fu Yang, Taoyuan County (TW); Chun-Yen Yeh, New Taipei (TW); Yen-Hua Chang, New Taipei (TW); To-Mei Wang, New Taipei (TW); Wen-Cheng Lee, Taoyuan County (TW); Kin-Seng Sun, Taoyuan County (TW); Chin-Ching Tzeng, New Taipei (TW)

(73) Assignee: Atomic Energy Council—Institute of Nuclear Energy Research, Lungtan, Taoyuan (TW)

( * ) Notice: Subject to any disclaimer, the term of this patent is extended or adjusted under 35 U.S.C. 154(b) by 231 days.

(21) Appl. No.: 13/106,061

(22) Filed: May 12, 2011

(65) Prior Publication Data
US 2012/0289396 A1    Nov. 15, 2012

(51) Int. Cl.
*B29B 17/00* (2006.01)
*D01F 13/00* (2006.01)
*C04B 35/00* (2006.01)

(52) U.S. Cl.
USPC ............ 264/37.29; 264/37.1; 501/153

(58) Field of Classification Search
USPC ............ 501/127, 153; 264/37.1, 37.29, 264/128
See application file for complete search history.

(56) References Cited

U.S. PATENT DOCUMENTS

| | | | | |
|---|---|---|---|---|
| 4,690,763 A * | 9/1987 | Rieger et al. | | 210/496 |
| 5,397,379 A * | 3/1995 | Barker et al. | | 75/319 |
| 6,077,796 A * | 6/2000 | Beall et al. | | 501/9 |
| 6,337,295 B1 * | 1/2002 | Harada | | 501/1 |
| 6,342,461 B1 * | 1/2002 | Lee et al. | | 501/141 |
| 2005/0116395 A1 * | 6/2005 | Tsai | | 264/655 |

* cited by examiner

*Primary Examiner* — Noah Wiese
(74) *Attorney, Agent, or Firm* — Jackson IPG (57) ABSTRACT

Disclosed is a method for making a refractory material from aluminum residues of aluminum recycling. At first, the aluminum residues is mixed with adhesive solution so that the percentage by weight of the adhesive solution is 5 wt % to 10 wt %. The mixture is granulated into grains. The grains are filled in a mold, pressed and then removed from the mold so that the grains are turned into a green body. The green body is heated in a furnace at a range of temperature from 1100° C. to 1400° C. so that the grains are sintered and become a refractory material.

3 Claims, 6 Drawing Sheets

METHOD FOR PRODUCING A REFRACTORY MATERIAL FROM ALUMINUM RESIDUES

BACKGROUND OF INVENTION

1. Field of Invention

The present invention relates to a method for making a highly value-added refractory material and, more particularly, to a method for producing a refractory material including the steps of mixing aluminum residues with adhesive solution, granulating the mixture into grains, and forming the grains into a refractory material.

2. Related Prior Art

Waste aluminum is often recycled since the recycling of waste aluminum produces less pollution than the refinery of bauxite. At first, waste aluminum is collected. The waste aluminum is classified into new and used waste aluminum for example. The new waste aluminum includes burrs, scraps and disqualified products and takes up about 70 wt % of the waste aluminum. The used waste aluminum includes cables, parts of car bodies, cast products, cans and appliances. Then, the waste aluminum is generally melted in a small aluminum-melting furnace with a capacity of 1.5 to 7.5 ton/day. Finally, the melted aluminum is molded and made into aluminum nuggets.

Byproducts of the recycling of waste aluminum include aluminum residues that include dross and ash. An aluminum-recycling process includes the step of melting waste aluminum, the step of collecting the melted aluminum and the step of cooling. Exhaust from the aluminum-recycling process includes suspended particles that pollute the air. These suspended particles are collected by air pollution-preventing means in Donaldson DCE and the collected ash is generally called "white ash", Murayama, N., Shibata, J., Sakai, K., Nakajima, S, and Yamamoto, H., "Synthesis of hydrotalcite-like materials from various wastes in aluminum regeneration process", Resource Processing 53, pp. 6-11, 2006 or ash of secondary metallurgy of aluminum (or "aluminum ash"). The aluminum ash takes up about 1 wt % of the recycled waste aluminum. The aluminum ash includes $Al_2O_3$ and MgO and carbon released from the combustion of fuel in the aluminum-melting furnace. Moreover, there is dross floating on the melted aluminum in the aluminum-melting process. The dross includes metallic aluminum, aluminum oxide and aluminum nitride, depending on the components of the waste aluminum. The dross is about 15 wt % of the recycled waste aluminum. The dross or ash of the aluminum residues, including aluminum nitrides, absorbs water in the air and gets hydrolyzed. Hence, there is a stinky smell.

Currently, aluminum residues is neutralized and solidified before it is disposed of or buried, Hermsmeyer, D., Diekmann, R., Ploeg R. R. and Horton R., "Physical properties of a soil substitute derived from an aluminum recycling by-product", Journal of Hazardous Materials B95, pp. 107-124, 2002; Shinzato, M. C. and Hypolito, R., "Solid waste from aluminum recycling process: characterization and reuse of its economically valuable constituents", Waste Management 25, pp. 37-46, 2005; and Murayama, N., Arimura, K., Okajima, N. and Shibata, J., "Effect of structure-directing agent on $AlPO_4$-n synthesis from aluminum dross", International Journal of Mineral Processing 93, pp. 110-114, 2009.

Dross and ash are piled up or buried and will impose serious impacts on the environment and cause damage to human health if they are mishandled. Hence, neither piling up nor burial is good for handling the dross or ash. The dross and ash however possess commercial values. Therefore, there is a need for a method to recycle and use the dross and ash as zero waste and recycling are concerned.

As disclosed in Taiwanese Patent No. 583155, "Method for Using Aluminum Residues", aluminum residues is heated and roasted into aluminum oxide (or "corundum") that can be used as a refractory material.

As disclosed in Taiwanese Patent I319015, "Method for Recycling Secondary Aluminum Residues", wet chemistry is used to add an oxidizing agent and sodium hydroxide to turn aluminum nitrides and fine metal powder into stable aluminum oxide. The method is however complicated.

On the other hand, refractory materials are generally made of mined natural substances. The use of such refractory materials increases the mining of such natural substances and the release of carbon dioxide during the mining, and imposes impacts on the environment. Hence, the refractory materials are expensive.

The present invention is therefore intended to obviate or at least alleviate the problems encountered in prior art.

SUMMARY OF INVENTION

It is an objective of the present invention to provide a method for making a highly value-added refractory material from residues of aluminum recycling.

It is another objective of the present invention to provide a method for making an excellent refractory material from aluminum oxide and silicon oxides in dross and ash of aluminum recycling.

It is another objective of the present invention to provide a method for testing the physical and chemical properties of a refractory material made from dross and ash of aluminum recycling.

It is another objective of the present invention to provide a method for making an inexpensive, environmentally friendly product from recycled natural resources, thus reducing exploitation of natural resources and sabotage of the environment.

It is another objective of the present invention to provide a method for making a refractory material from dross and ash of aluminum recycling without having to use a lot of additional aluminum oxide, aluminum hydroxide and silicon oxides therein.

To achieve the foregoing objectives, the method includes the step of mixing the residues with adhesive solution so that the percentage by weight of the adhesive solution is 5 wt % to 10 wt %. The mixture is granulated into grains. The grains are filled in a mold, pressed and then removed from the mold so that the grains are turned into a green body. The green body is heated in a furnace at a range of temperature from 1100° C. to 1400° C. so that the grains are sintered and become a refractory material.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
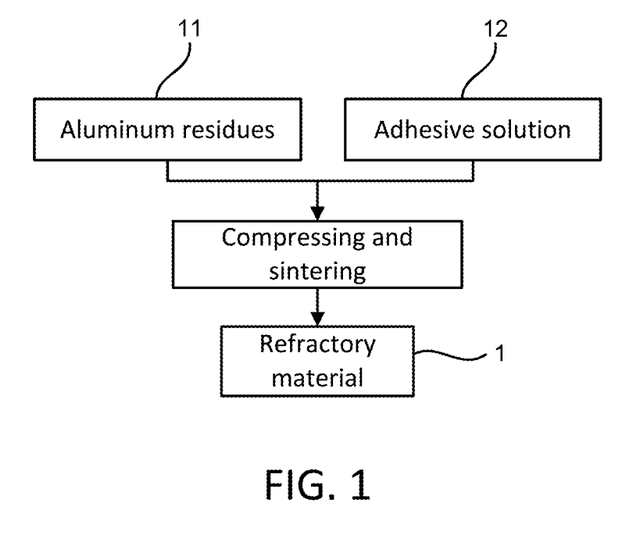
FIG. 1 is a flow chart of a method for making a refractory material from residues of aluminum recycling according to the preferred embodiment of the present invention.

Referring to FIG. 1, there is shown a method for making a refractory material from residues of aluminum recycling according to the preferred embodiment of the present invention. At first, there is provided aluminum residues 11 of aluminum recycling, i.e., secondary metallurgy of aluminum. Provided also is adhesive solution 12. Secondly, the aluminum residues 11 are mixed with the adhesive solution 12. Then, the mixture is granulated into grains. Finally, the grains are compressed and sintered, thus providing a refractory material 1.

Figure 2:
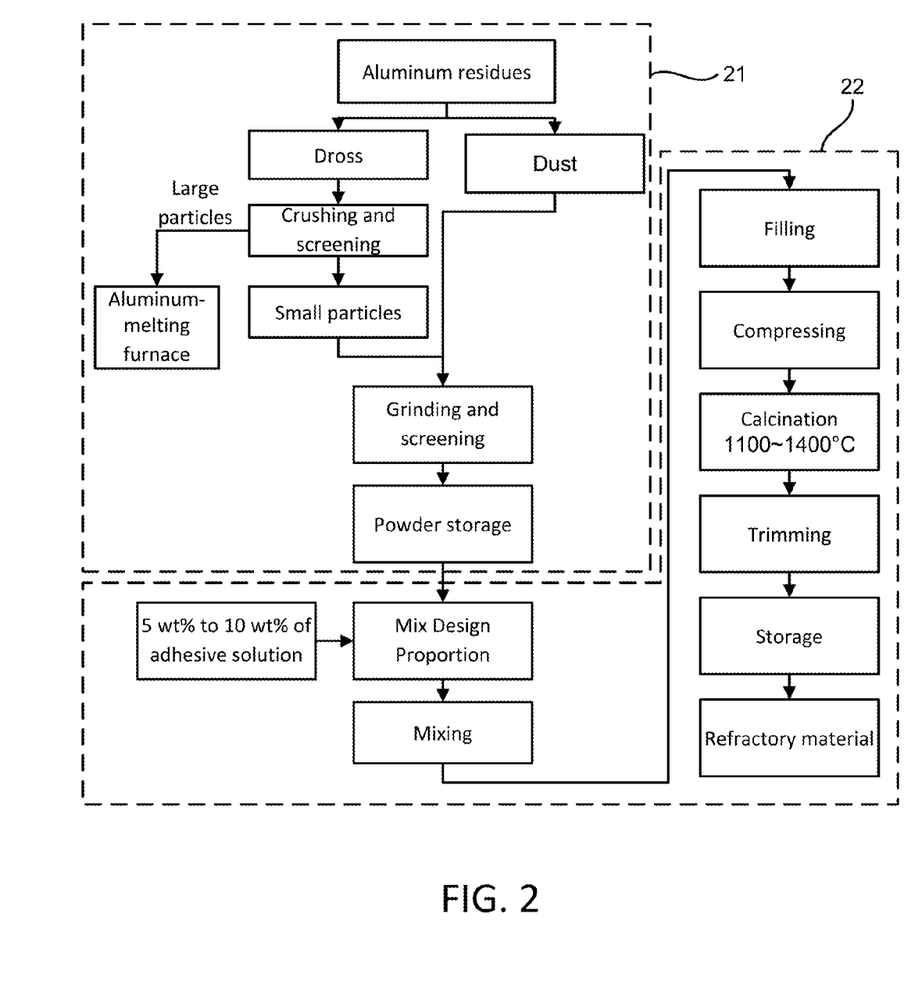
FIG. 2 is a more detailed flow chart of the method shown in FIG. 1.

Referring to FIG. 2, more details are given of the method shown in FIG. 1. At 21, the aluminum residues 11 is provided and processed. At 22, the aluminum residues 11 are mixed with the adhesive solution 12 and the mixture is processed to provide the refractory material 1.

At 21, used waste aluminum is recycled. The recycling of the used waste aluminum includes collection, classification and melting. The melting is done in an aluminum-melting furnace. The aluminum residues 11 are provided as a byproduct of the recycling of the used waste aluminum. The aluminum residues 11 are classified into dross and ash. The dross is crushed and screened, thus separating large particles from small particles. The large particles are fed to the aluminum-melting furnace. The small particles are mixed with the ash. The mixture of the small particles with the ash is crushed, grinded and screened to provide powder. The powder is stored for later use.

At 22, the adhesive solution 12 is provided. The adhesive solution 12 is carboxyl methyl cellulose ("CMC") preferably. The molecular formula of CMC is $[C_6H_7O_2(OH)_2CH_2COONa]_n$. The adhesive solution 12 and the powder are measured and matched with each other. The adhesive solution 12 is mixed with the powder at a ratio of 5 to 10 wt %.

The mixture of the adhesive solution 12 with the powder is granulated into grains. The grains are filled in a mold. The grains are compressed in the mold and turned into a green body. The green body is removed from the mold and heated at 1100° C. to 1400° C., thus sintering the grains and turning the same into the refractory material 1. Finally, the refractory material 1 is trimmed. The refractory material 1 is stored to provide a firebrick for example. Furthermore, the refractory material 1 can be used to make an insulating firebrick, an aluminous firebrick, a chemical acid-resisting brick for use in the chemical inashry, a firebrick for use in a steel-melting furnace and a clay firebrick for use in metallurgy. The firebrick for use in a steel-melting furnace may be used in a cover of an aluminum-melting furnace, a piston, a nozzle, a socket and a channel.

Various tests have been conducted on the refractory material 1 made by mixing the aluminum residues 11 with the adhesive solution 12 in the method described above referring to FIG. 2. Some physical and chemical properties and mechanical strengths of the refractory material 1 are measured as the calcination temperature is changed but the percentage by weight of the adhesive solution 12 is retained. The measured physical and chemical properties and mechanical strengths include the true density, bulk density, porosity, open porosity, compressive strength, flexural strength, chemical composition and toxicity characteristic leaching of the refractory material 1. The weight of the aluminum residues 11 is 6 kg while the percentage by weight of the adhesive solution 12 is 5 wt %, 6 wt %, 7 wt %, 8 wt %, 9 wt % or 10 wt %. Conditions for the tests are listed in Table 1 as follows:

TABLE 1

| Batch | aluminum residues (kg) | Adhesive Solution (%, V/W) | Calcination Temperature (° C.) | Note(s) |
|---|---|---|---|---|
| 1 | 6 | 5 | — | Observed after Granulation |
| 2 | 6 | 6 | — | Observed after Granulation |
| 3 | 6 | 7 | — | Observed after Granulation |
| 4 | 6 | 8 | — | Observed after Granulation |
| 5 | 6 | 9 | — | Observed after Granulation |
| 6 | 6 | 10 | — | Observed after Granulation |
| 7 | 6 | 8 | 1100 | Observed after Calcination |
| 8 | 6 | 8 | 1200 | — |
| 9 | 6 | 8 | 1300 | — |
| 10 | 6 | 8 | 1350 | — |
| 11 | 6 | 8 | 1400 | — |

Figure 3:
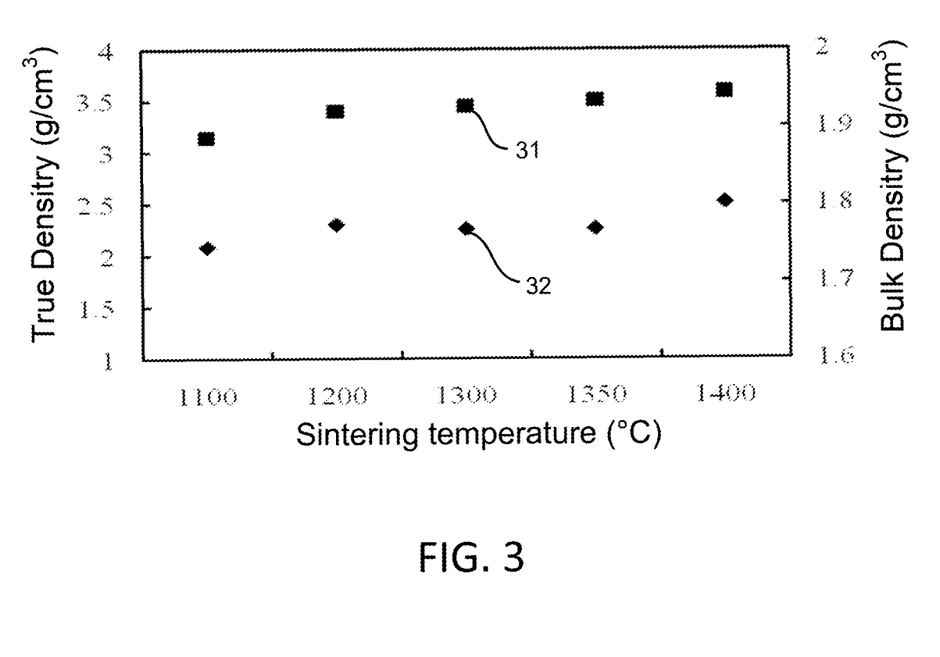
FIG. 3 is a chart of the true density and bulk density versus the calcination temperature of the refractory material made in the method shown in FIG. 2.

Referring to FIG. 3, there are shown the true density and bulk density of the refractory material 1 versus the calcination temperature. The aluminum residues 11 are mixed with a small amount of adhesive solution 12 such as CMC. The mixture is granulated into the grains. The forming of the green body is done by pressing the grains with a uni-axial compressive force of 20 or 150 tons. The calcination temperature is set to be 1100° C., 1200° C., 1300° C., 1350° C. or 1400° C. Open porosity, water absorbency, specific gravity, the specific gravity test method and Archimedes principle, the bulk density, open porosity and porosity of the refractory material 1 are measured according to CNS 619. A curve 31 stands for the true density of the refractory material 1 and another curve 32 stands for the bulk density of the refractory material 1. The true density of the refractory material 1 is 3.14 to 3.55 g/cm$^3$ while the bulk density of the refractory material 1 is 1.75 to 1.80 g/cm$^3$. Obviously, the bulk density and true density of the refractory material 1 increase with the calcination temperature.

Figure 4:
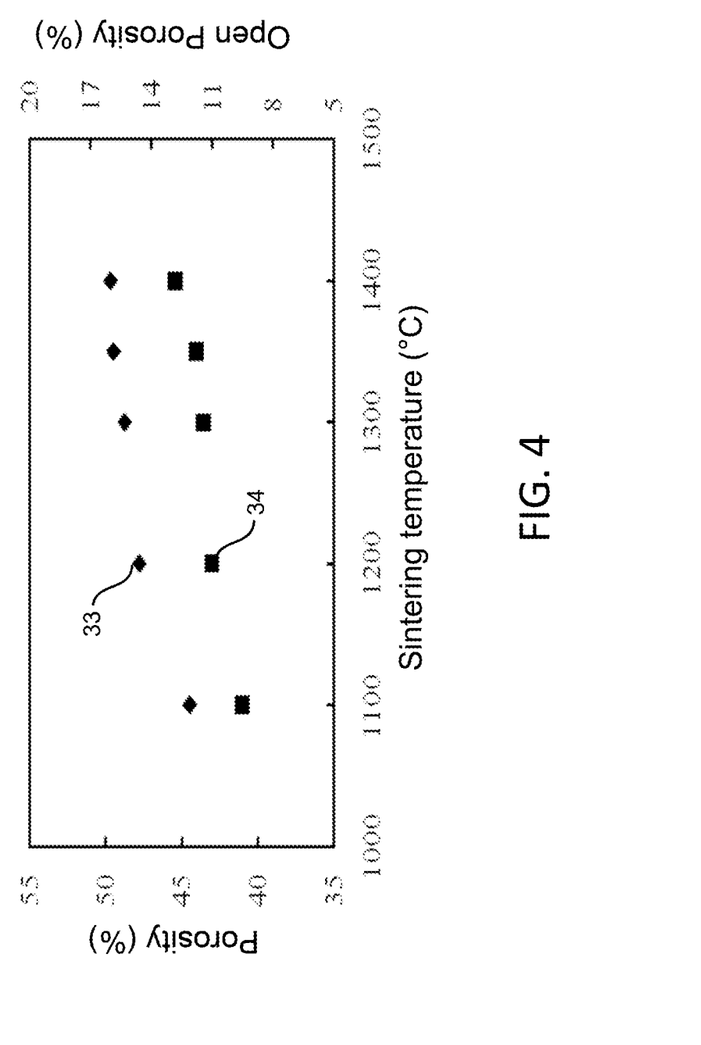
FIG. 4 is a chart of the porosity and open porosity versus the calcination temperature of the refractory material made in the method shown in FIG. 2.

Referring to FIG. 4, there are shown the porosity and open porosity of the refractory material 1 versus the calcination temperature. A curve 33 stands for the porosity of the refractory material 1 and another curve 33 stands for the open porosity of the refractory material 1. The open porosity of the refractory material 1 changes with the calcination temperature between 9.5% and 12.8% while the porosity of the refractory material 1 changes with the calcination temperature between 44.5% and 49.7%. Obviously, the open porosity and porosity of the refractory material 1 increase with the calcination temperature. By observing the refractory material from the outside, it is learned that cracks occur on the refractory material 1, although not obviously, as the calcination temperature is high such as 1350° C. and 1400° C. There is no crack on the refractory material when the calcination temperature is 1100° C., 1200° C. or 1300° C. Therefore, based on the data of the bulk density and porosity, the performance of the refractory material 1 is excellent.

Figure 5:
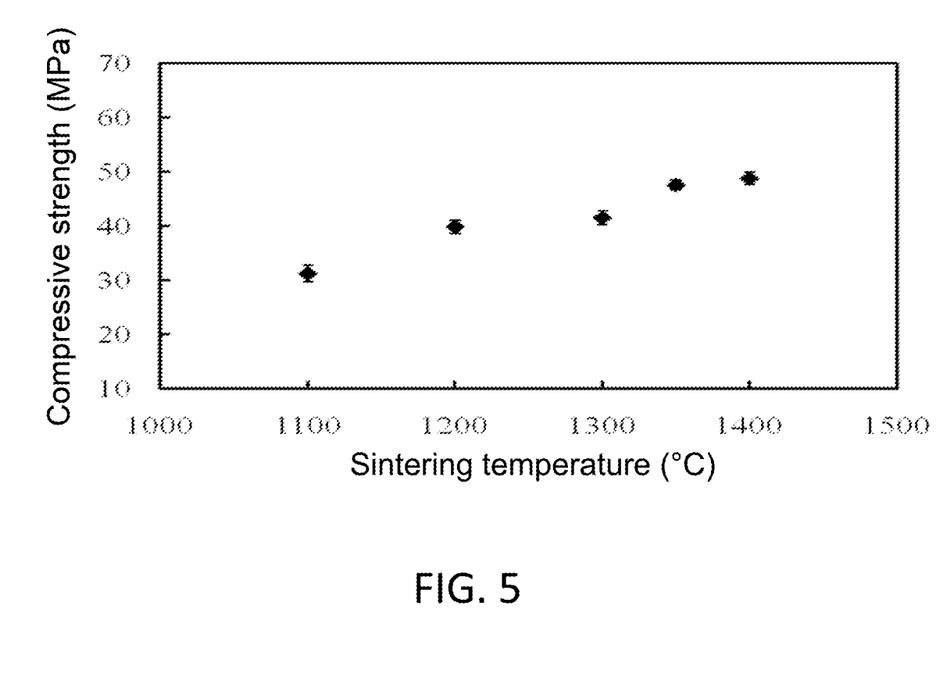
FIG. 5 is a chart of the compressive strength versus the calcination temperature of the refractory material made in the method of FIG. 2.

Referring to FIG. 5, there is shown the compressive strength of the refractory material 1 versus the calcination temperature. Tests are conducted on the compressive strength of the refractory material 1 in compliance with the regulations of CNS 11740 and CNS 616, with the number of the tested specimens set to be 5, the size of the tested specimens set to be 60 (L)×60 (D)×65 (T) mm, the maximum load on the test bench set to be 20 tons. The compressive strength of the refractory material 1 increases with the calcination temperature. Where the calcination temperature is 1100° C. to 1400° C., the compressive strength is 31~48 MPa (306.1~477.4 kgf/cm$^2$). Therefore, the compressive strength of the refractory material 1 is in compliance with the regulations for clay firebricks for metallurgy in CNS 239 and firebricks for use in a cover of an aluminum-melting furnace, a piston, a nozzle, a socket and a channel of set forth in CNS 3588. Such tests however are not regulated in CNS 2352 for aluminous firebricks. The compressive strength increases with the calcination temperature since the grains of the refractive material 1 stick together and the refractory material 1 shrinks and gets denser. That is, as the refractory material 1 is calcinated, the surface energy of the powder thereof is higher than the free energy therein, and the entire system advances toward lower energy. To reduce the surface energy of the powder of the refractory material 1, atoms spread between the grains, and necks are formed between the grains because of sintering, thus reducing the surface energy of the refractory material 1.

Figure 6:
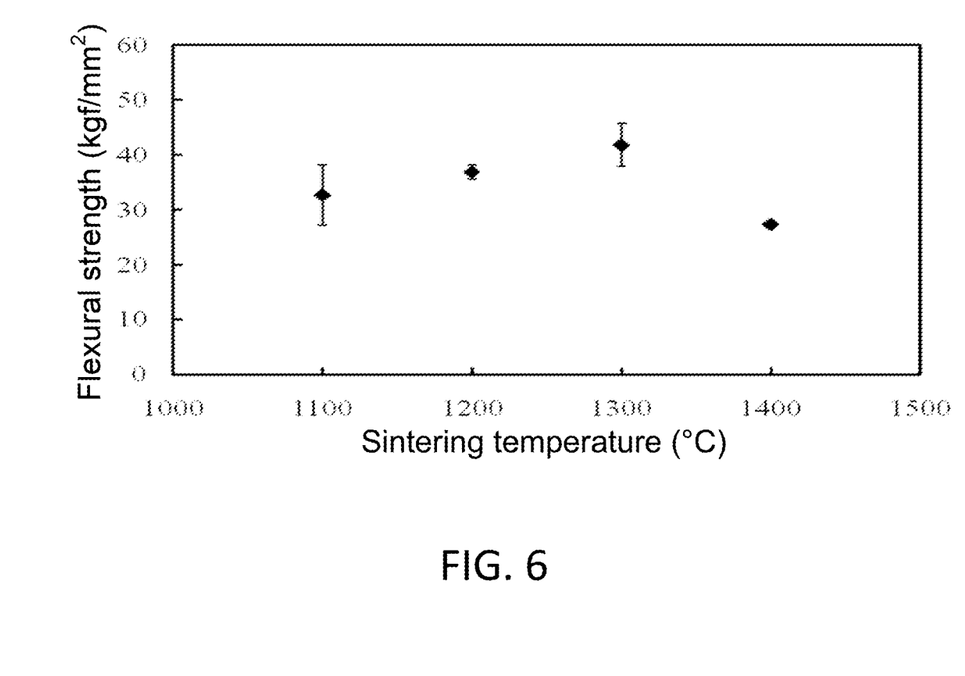
FIG. 6 is a chart of the flexural strength versus the calcination temperature of the refractory material made in the method shown in FIG. 2.

Referring to FIG. 6, there is shown the flexural strength of the refractory material 1 versus the calcination temperature. Tests are conducted on the reflexural strength of the refractory material 1 in compliance with the regulations of CNS 11739 and CNS 12764, with the number of the tested specimens set to be 5, the size of the tested specimens set to be 230 (L)×114 (W)×65 (T) mm, the maximum load on the test bench set to be 20 tons. The reflexural strength of the refractory material 1 increases with the calcination temperature. Where the calcination temperature is 1100° C. to 1300° C., the reflexural strength is 32.6 to 41.8 kgf/cm$^2$. These tests are not regulated in CNS 239 for metallurgy clay firebricks, CNS 3588 for firebricks for steel-melting furnaces or CNS 2352 for aluminous firebricks.

The analysis of the chemical composition of the refractory material 1 is helpful to determine in which category of CNS the refractory material 1 falls. $Al_2O_3$, $SiO_2$ and $Fe_2O_3$ of the refractory material 1 are important components for determining the usage, type and classification of the refractory material 1. According to the chemical composition of the refractory material 1, the refractory material 1 may be classified in aluminous firebricks (CNS 2352), firebricks for use in steel-melting furnaces (CNS 3588), insulating firebricks (CNS 1047) or clay firebricks for use in metallurgy (CNS 2394). The results of the analysis of the chemical composition of the refractory material 1 are listed in Table 2. As set forth in Table 2, the chemical composition of the refractory material 1 mildly changes with the calcination temperature between 1100° C. and 1400° C. The refractory material 1 contains $Al_2O_3$, $SiO_2$, MgO and a small amount of $Fe_2O_3$ (0.54%~1.05%). The $Al_2O_3$, $SiO_2$ and MgO take up 63.52% to 80.80%, 12.19% to 30.84%, and 3.66% to 4.44%, respectively. Based on the chemical composition, the refractory material 1 may be classified in aluminous firebricks, clay firebricks for use in metallurgy or firebricks for use in steel-melting furnaces (aluminous firebricks for use in covers of furnaces, pistons, nozzles, sockets or channels). Although CNS 239 for clay firebricks of metallurgy does not regulate such items, CNS 2352 for aluminous firebricks regulates that the concentration of $Al_2O_3$ be higher than 50%, and CNS 3588 for firebricks for use in steel-melting furnaces regulates that the concentration of $Al_2O_3$ be higher than 55%. Hence, the refractory material 1 is in compliance with the above-mentioned judgment.

TABLE 2

|  | $Al_2O_3$ | $SiO_2$ | MgO | $Fe_2O_3$ | CaO | $Na_2O$ | $K_2O$ | CuO | $Cr_2O_3$ |
| --- | --- | --- | --- | --- | --- | --- | --- | --- | --- |
| 1100° C. | 63.52 | 30.84 | 3.66 | 0.54 | 0.56 | 0.33 | 0.42 | 0.06 | 0.03 |
| 1200° C. | 75.35 | 17.83 | 4.27 | 0.67 | 0.65 | 0.56 | 0.48 | 0.14 | 0.04 |
| 1300° C. | 78.44 | 14.99 | 4.09 | 0.68 | 0.72 | 0.53 | 0.37 | 0.07 | 0.03 |
| 1350° C. | 79.31 | 13.96 | 4.04 | 1.05 | 0.67 | 0.49 | 0.36 | 0.07 | 0.07 |
| 1400° C. | 80.80 | 12.19 | 4.44 | 0.73 | 0.67 | 0.44 | 0.49 | 0.20 | 0.05 |

Furthermore, heavy metals such as selenium, mercury, lead, cadmium, chromium (total chromium), hexavalent chromium, barium and arsenic are measured in the TCLP. The pH and the concentrations of the heavy metals of the refractory material 1 are listed in Table 3. The pH of the refractory material 1 is 9.7. Obviously, the amount of the heavy metals released from the refractory material 1 is much smaller than regulated in related rules. Hence, there is not any concern about the heavy metals released from the refractory material 1 according to the TCLP. Hence, the refractory material 1 is made from aluminum residues without having to use additional metal oxides, thus reducing the consumption of the natural resources and impacts on the environment.

TABLE 3

| Tested Item | Measured Value | MDL | Standard Unit |
| --- | --- | --- | --- |
| Concentration Index of Hydrogen Ion | 9.7 |  |  |
| Hexavalent Chromium in Extraction Liquid | ND[a,b] | 0.0065 | 2.5 mg/L |
| Mercury in Extraction Liquid | ND | 0.000037 | 0.2 mg/L |
| Arsenic in Extraction Liquid | ND | 0.0078 | 5 mg/L |
| Copper in Extraction Liquid | <0.020[c] | 0.0062 | 15 mg/L |
| Chromium in Extraction Liquid | 0.316 | 0.0061 | 5 mg/L |
| Cadmium in Extraction Liquid | ND | 0.0059 | 1 mg/L |
| Lead in Extraction Liquid | ND | 0.0065 | 5 mg/L |
| Selenium in Extraction Liquid | <0.025 | 0.0085 | 1 mg/L |
| Barium in Extraction Liquid | 0.623 | 0.0060 | 100 mg/L |

In Table 3,
[a]means that the measured value is lower than the MDL and is expressed by "ND" and the MDL and unit are listed.
[b]means that the concentration of the hexavalent chromium in the extraction liquid is diluted to one tenth and is lower than the standard, and the measured value is one tenth of the original value.
[c]means that the measured value is lower than the lowest concentration of the checking-measuring curve but higher than the MDL and is expressed by "< the lowest concentration of the checking-measuring curve."

From the tests, it is learned that the aluminum residues 11 is recycled and used in the refractory material 1. The concentration of the adhesive solution 12, CMC, is preferably 8%

(V/W) to make sure that it is well mixed with the powder so that the forming of the refractory material is perfect. The calcination temperature is preferably 1100° C. to 1300° C. For example, the calcination temperature is 1200° C., the bulk density and open porosity of the refractory material are 1.78 g/cm$^3$ and 11%, respectively, while the compressive strength and reflexural strength are 390.6 kgf/cm$^2$ and 36.8 kgf/cm$^2$, respectively. The chemical composition of the refractory material 1 includes 75.35 wt % of $Al_2O_3$. There is not any concern about heavy metals released from the refractory material 1 according to the TCLP. The refractory material 1 is used in aluminous firebricks regulated in CNS 2352, clay firebricks for use in metallurgy regulated in CNS 2394 and firebricks for use in steel-melting furnaces regulated in CNS 3588 such as aluminous bricks for use in covers of furnaces and pistons and firebricks for use in nozzles, sockets and channels.

According to the present invention, the aluminum residues 11 is recycled and used to make the refractory material 1 with marginal benefits including reduction of impacts and burdens on the environment related to burial of aluminum residues, reduction of costs related to burial of aluminum residues (NT $1600 to 2800 per ton), and increase of profits related to the commercialization of the aluminum residues 11. As the prices of various materials are skyrocketing, the refractory material 1 is provided by recycling the aluminum residues 11 without having to use additional materials such as $Al_2O_3$, $Al(OH)_3$ and $SiO_2$. Therefore, the provision of the refractory material 1 from the aluminum residues 11 is a good way to reduce the cost. Moreover, the consumption of the natural resources and the sabotage of the environment are reduced. Therefore, the method of the present invention is environmentally beneficial.

Refractory materials are fundamental materials for heat preservation and heat insulation and are generally made from metal oxides such as $Al_2O_3$, $SiO_2$ and MgO. One common feature of these refractory materials is a high melting point. Therefore, these refractory materials are used in furnaces and heat-preserving devices. Aluminous firebricks, heat-preserving bricks and insulating firebricks are often used in an incinerator. In the present invention, the used waste aluminum is recycled and melted in the aluminum-melting furnace, and the aluminum residues 11 including the dross and ash is provided from the aluminum-melting furnace and used to commercially provide the refractory material 1, and the basic physical and chemical properties of the refractory material 1 are measured. The composition of the refractory material 1 includes inorganic $Al_2O_3$ and $SiO_2$ that are refractory. Hence, the aluminum residues including the dross and ash is recycled and commercialized to increase the value of the aluminum residues and reduce costs related to burial of aluminum residues. Moreover, the making of the refractory material 1 from the aluminum residues 11 is environmentally friendly.

Conclusively, the method for making the refractory material 1 from the aluminum residues 11 overcome the problems with the prior art. By mixing the aluminum residues 11 with the adhesive solution 12 to make the refractory material 1, the value of the aluminum residues 11 is increased, the profit enjoyed by a maker of the refractory material 1 is increased, the cost related to the burial of the aluminum residues is reduced, the lives of dumpsites are extended, and the impacts on the environment are reduced.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for making a refractory material comprising the steps of:
   providing aluminum residues of aluminum recycling;
   providing carboxylmethyl cellulose adhesive solution;
   mixing the aluminum residues with the adhesive solution so that the adhesive solution takes up 5 wt % to 10 wt % of the mixture;
   granulating the mixture into grains;
   filling the grains in a mold;
   pressing the grains with a uni-axial compressive force in the mold into a green body;
   moving the green body from the mold; and
   calcinating the green body at 1100° C. to 1400° C. in a furnace, thus sintering the green body into a refractory material,
   wherein the resulting refractory material has a composition in weight percent of 63.52 to 80.8% $Al_2O_3$, 12.19 to 30.84% $SiO_2$, 3.66 to 4.44% MgO, 0.54 to 1.05% $Fe_2O_3$, 0.56 to 0.72% CaO, 0.33 to 0.56% $Na_2O$, 0.36 to 0.49% $K_2O$, 0.06 to 0.2% CuO, and 0.03 to 0.07% $Cr_2O_3$.

2. The method according to claim 1,
   wherein the adhesive solution has a molecular formula of $[C_6H_7O_2(OH)_2CH_2OONa]_n$.

3. The method according to claim 1,
   wherein the refractory material comprises a firebrick selected from the group consisting of insulating firebricks, alumina firebricks, acid-resisting bricks, and clay firebrick.

* * * * *